Feb. 27, 1962 H. H. CARY 3,022,704
SPECTROPHOTOMETER
Filed Feb. 23, 1954 4 Sheets-Sheet 1
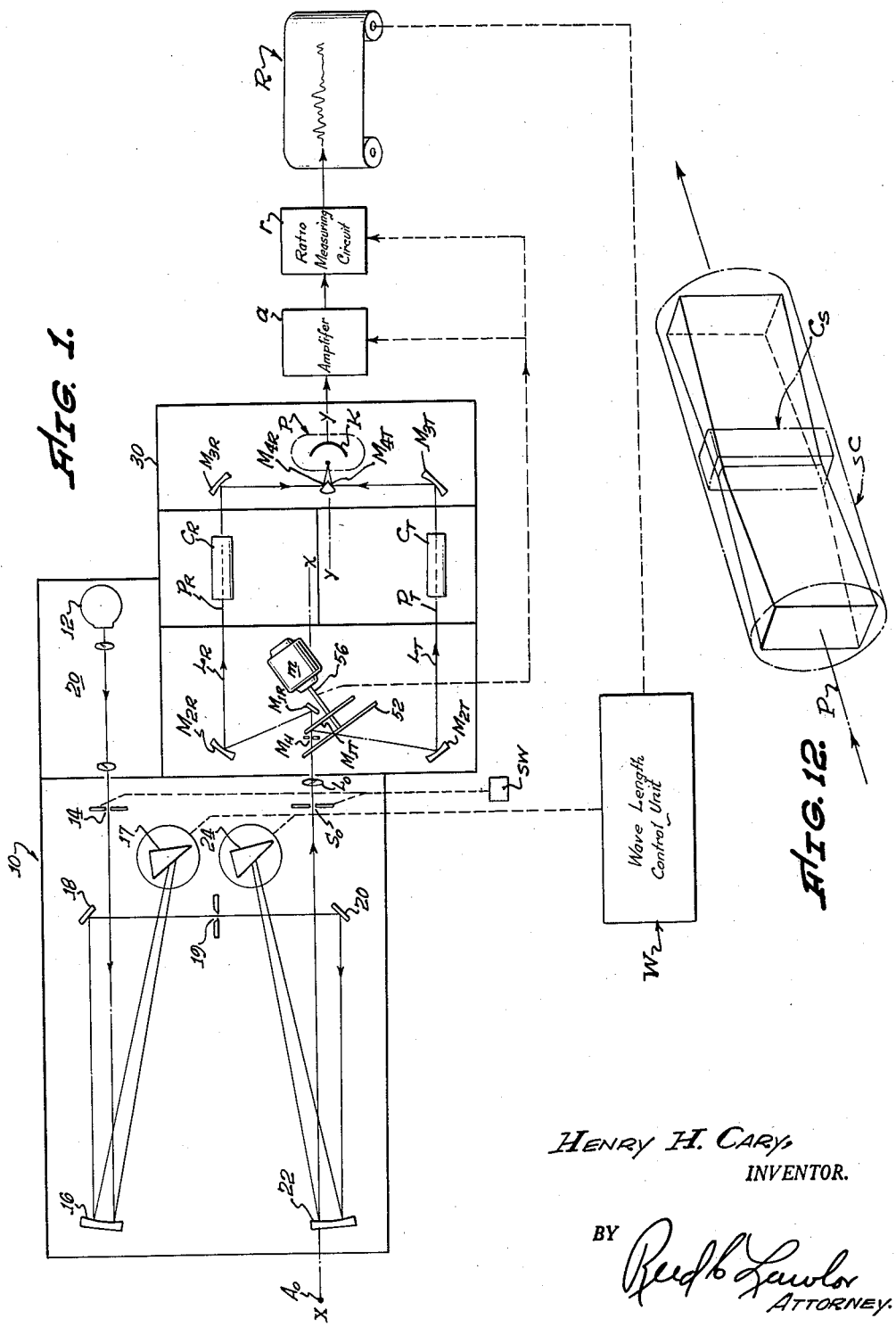
HENRY H. CARY,
INVENTOR.
BY
ATTORNEY.

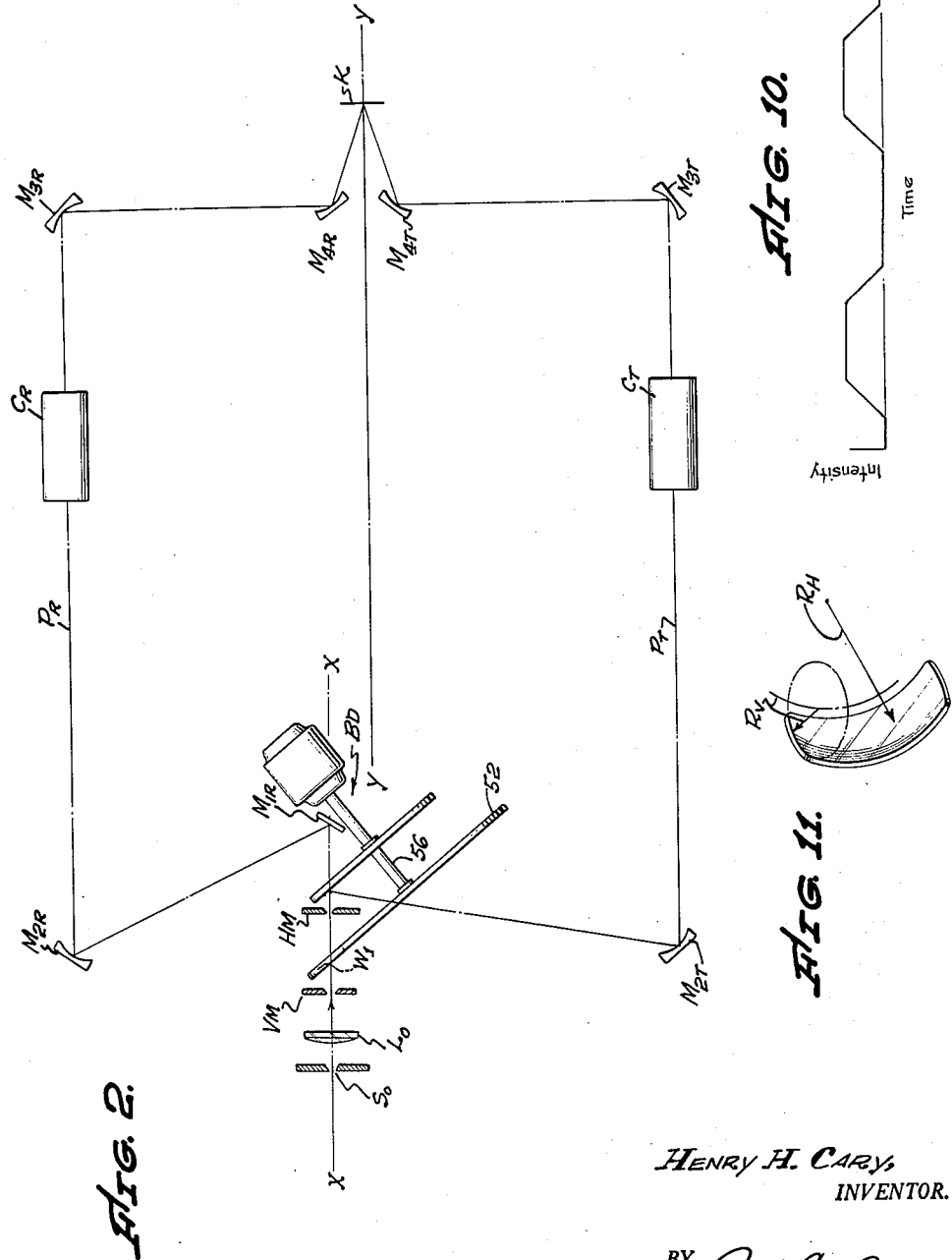

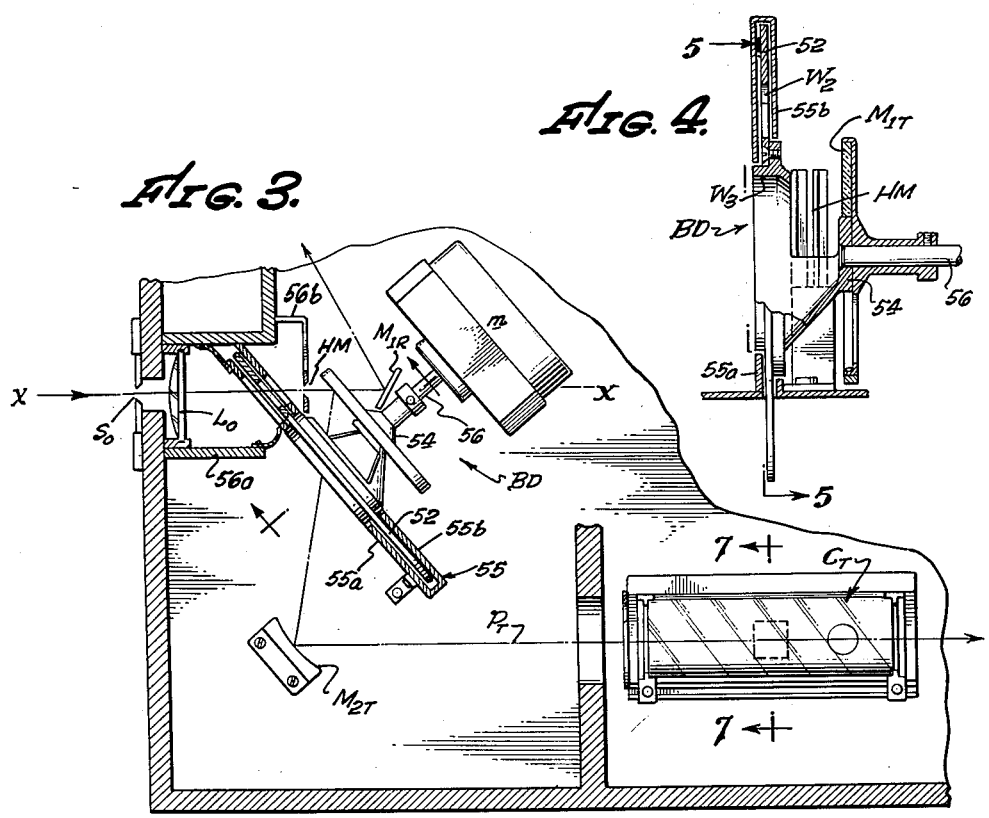
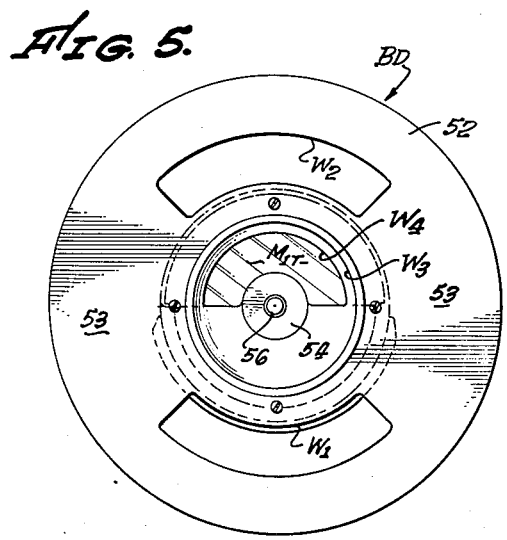
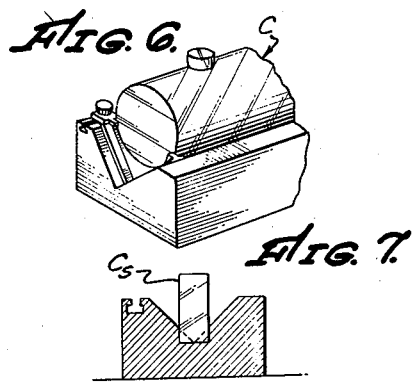
Henry H. Cary,
INVENTOR.

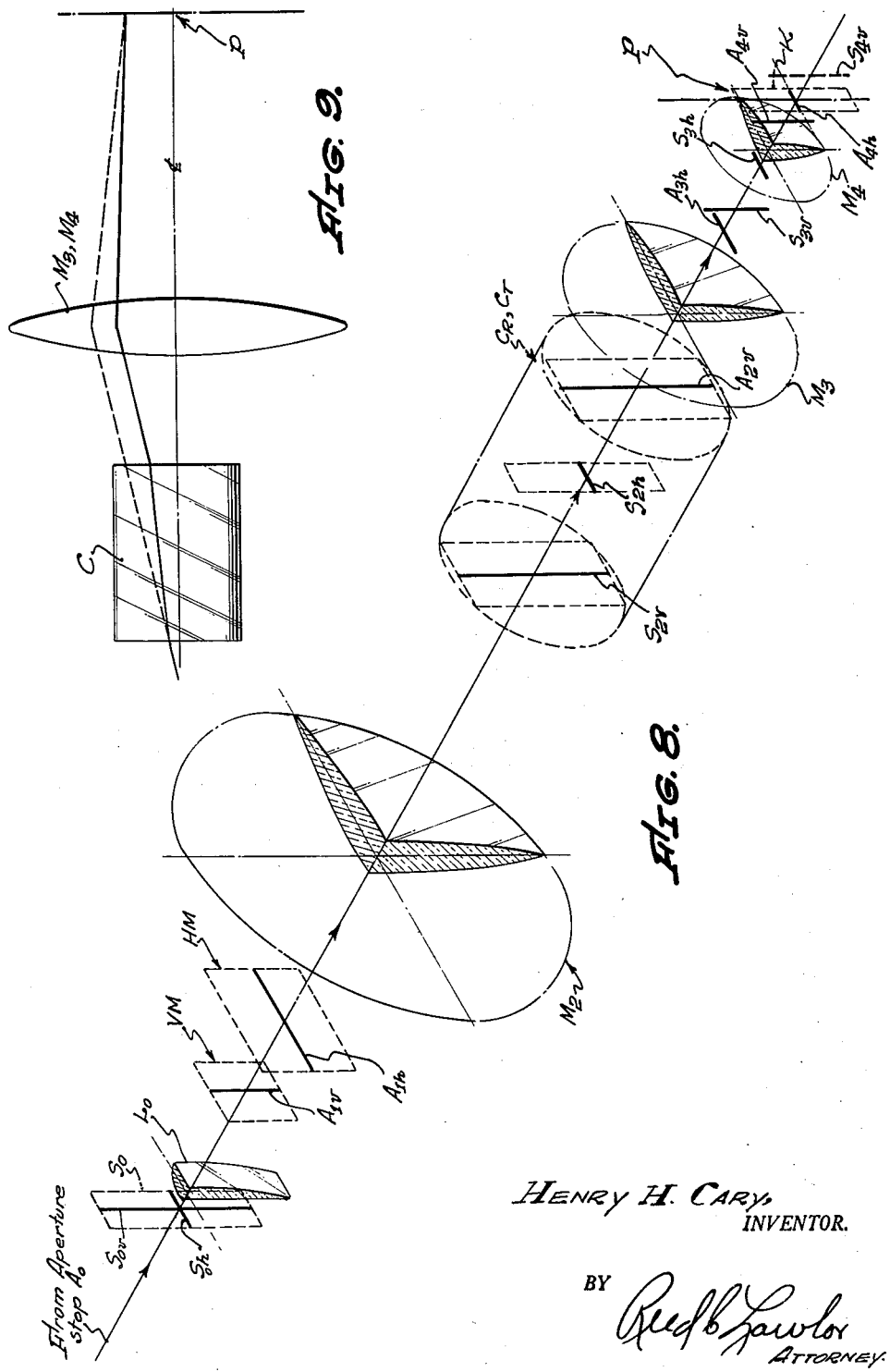

United States Patent Office

3,022,704
Patented Feb. 27, 1962

3,022,704
SPECTROPHOTOMETER
Henry H. Cary, Alhambra, Calif., assignor to Applied Physics Corporation, Monrovia, Calif., a corporation of California
Filed Feb. 23, 1954, Ser. No. 411,650
38 Claims. (Cl. 88—14)

This invention relates to photometry, and more particularly to improvements in spectrophotometry.

This invention is particularly applicable to systems of photometry and especially to systems of spectrophotometry in which the intensity of a radiation emerging from a specimen, whether it be by emission, scattering, reflection, or transmission, is measured by a photocell.

Although the invention is applicable to the measurement of other radiation coefficients of samples, such as coefficients representing emission characteristics, reflection characteristics, etc., it will be described hereinafter with particular reference to a system of spectrophotometry that is employed for measuring the spectral transmission coefficients of a fluid sample.

In many spectrophotometers the transmission coefficients of samples at different wavelengths are determined by dispersing white light into its spectral components in a monochromator and passing various monochromatic components of the radiation, one at a time, through the sample being tested. The transmission coefficient at each wavelength is measured by transmitting the radiation through the sample under investigation and to a photocell, and comparing the current produced by the photocell when the radiation is passed through the sample with the current that would be produced by transmitting the radiation to the photocell in the absence of the sample. In some spectrophotometers, the radiation is passed through a reference sample and a test sample, and a comparison is made of the intensity of the radiation after passing through the respective samples. In some arrangements the radiation is transmitted through the different samples to two separate photocells and the intensities of the radiation striking the respective photocells is compared to determine the ratio of the transmission coefficients of the two samples.

In still other arrangements, in order to overcome the errors that may be introduced because of differences in characteristics of photocells, especially characteristics that vary from time to time, radiation from a common source is transmitted to the reference sample and to the test sample alternately and from there to a single common photocell. In such a system a comparison is made of the currents produced by the photocell at different times corresponding to the times of transmission of light thereto through the reference sample and the test sample, respectively. A spectrophotometer of the type just mentioned, which is sometimes referred to as a "flicker-beam" spectrophotometer, is described in an article by D. F. Hornig, G. E. Hyde and W. A. Adcock and published in the August 1950 Journal of the Optical Society. In such a system, the transmission of radiation to the photocell is accomplished by means of a movable mirror which periodically intercepts the beam of light, chopping it into two series of separate pulses of light that pass alternately through the reference sample and through the test sample to the photocell. The two series of current pulses that are produced by the common photocell are sorted electrically and their amplitudes are compared in a ratio-measuring circuit in order to determine the transmission coefficient of the test sample. An improved arrangement for sorting and measuring such series of pulses is disclosed and claimed in copending patent application Serial No. 411,794, filed by Henry H. Cary and Roland C. Hawes on the 23rd day of February, 1954. The present invention, which constitutes an improvement over flicker-beam spectrophotometers that have been employed heretofore, as well as other photometers, relates to improvements in the optical system that transmits the radiation through the samples and to the photocell.

In the practice of spectrophotometry, various types of sample cells are employed. One type, which is referred to herein as a "long" sample cell, is tubular, being of circular, cylindrical cross-section with flat windows at the end. Such long sample cells are usually employed when the material to be tested has low absorption. Such cells are available in different sizes, one standard size having a length of about 10 cm. and a diameter of about 2 cm. Another type of sample cell that is employed in spectrophotometry and which for convenience is hereafter referred to as a "short" or "small" sample cell, is in the form of a test tube of rectangular configuration having long vertical windows on opposite sides thereof. A typical small cell may have a window height of 2 cm., or more, a window width of 0.5 cm. and a window separation of 0.5 cm.

In the making of intensity measurements, it is customary to employ photocells which have photosensitive elements, such as photocathodes, of small dimensions. For example, the IP28 photocells that are commonly employed have a sensitive photocathode area with a height of about 12 mm. and a width of about 3 mm. Both the sensitivity of the photocathode to white light and its spectral sensitivity to light of different wavelengths vary from point to point over its surface. For this reason, it is desirable to project the beam onto the photocathode in such a way that the distribution of light thereon is always the same.

One object of this invention is to provide a system of photometry in which the distribution of energy striking a photosensitive element is not modified substantially by changes in operating conditions, such as change of sample, change in the width of the exit slit of the monochromator, or change of wavelength.

Another object is to reduce the cross-section dimensions of the radiation passing through the sample space so as to reduce the volume of sample required for a given path length without unnecessary loss of light.

Another object of the invention is to provide a photometer of the flicker-beam type in which the location and distribution of light transmitted to a photo-sensitive element along different paths is substantially independent of any wobble of the light chopper.

Another object of the invention is to provide a flicker-beam system in which the properties of the optical systems along the two branch beams are substantially the same.

Another object of this invention is to provide a spectrophotometer in which detrimental effects that might be caused by diffraction of rays emerging from the exit slit are obviated.

Another object of this invention is to provide an optical system for a photometer which permits the use of the entire beam with both large and small sample cells.

In the past, to maintain the distribution of energy constant at the photocathode, the exit slit has been collimated with respect to the sample. The term collimation has generally been employed to indicate that a beam of light radiating from a point source at the focus of a focusing device has been converted by the focusing device into a plane parallel beam. In practice it is impossible to attain such a condition because there is no such thing as a point source in the geometrical sense. Strictly speaking, in those collimating systems, the radiation from each point of a source arranged in the focal plane of the focusing device has emerged as a plane parallel beam containing only an infinitesimal amount of energy. In the past, a collimated beam that has been directed to a sample chamber in a spectrophotometer is therefore, strictly speaking, a beam which was formed by placing the exit slit of a monochromator in the focal plane of the focusing device which directs the beam through the sample chamber.

According to a well-known theorem known as Lagrange's Theorem, a constant relationship exists between the cross-sections of the useful beam at various positions and the spacing between the positions. By designing the cross-sections of various parts of the instrument so that they satisfy Lagrange's Theorem throughout, it is possible to transmit light through the instrument without loss of light by cutting out parts of the beam as it is transmitted from one part thereof to another. In a spectrophotometer the Lagrange constant of the monochromator is determined by elements in the monochromator, and more particularly by the dimensions of the exit slit, the dimensions of the aperture stop, and the distance between them.

It has long been known that the cross-section of a cylindrical sample chamber can be made a minimum by focusing an image of the aperture stop at one end of the sample and an image of the exit slit at the other end of the sample and by making these two images of the same size. This principle has been discussed by Von G. Hansen at page 342 of an article entitled "Abbildung von Volumenstrahlern in Spektrographen," published in the vol. 6, pp. 337–347 (1950), issue of Optik. For this reason, this principle is referred to hereinafter as Hansen's rule. It will be noted that if Hansen's rule is satisfied, the exit slit is not collimated in the sample region. For this reason it has been believed heretofore that Hansen's rule cannot be satisfied at the same time that the requirement for maintaining a constant distribution of energy at the photocathode is met.

I have discovered that such collimation of the exit slit at the sample region is not necessary to the maintenance of uniform distribution of energy at the photocathode. In fact, I have found that such collimation is undesirable, and that superior results can be obtained by focusing the radiation at areas in the samples and by arranging the photocell at the focal position of an optical device that lies between the sample and the photocell. More particularly, in accordance with this invention, as applied to spectrophotometry, images of the exit slit and the aperture stop of the monochromator are focused vertically at opposite ends of the sample region in accordance with Hansen's rule as applied to a vertical plane, an image of the exit slit is focused horizontally between the ends of the sample region, and the aperture stop is collimated horizontally in the sample region.

By so focusing the beam in the sample region and collimating the photocathode with respect to the sample region in both a vertical plane and in a horizontal plane, all the benefits of collimation and all the benefits of satisfying Hansen's rule are obtained simultaneously. To accomplish these results in the flicker-beam spectrophotometer described herein, I employ astigmatic toric mirrors at certain points and anastigmatic toric mirrors at other points.

The foregoing and other objects and features of the invention will be best understood by reference to the following specification taken in connection with the accompanying drawings, which illustrate a single embodiment of the invention and in which:

FIG. 1 is a schematic diagram of a spectrophotometer embodying the invention;
FIG. 2 is a layout showing the optical paths in the testing unit of the spectrophotometer;
FIG. 3 is a fragmentary plan view of a part of the testing unit specifically showing the beam director;
FIG. 4 is a side elevational view of a part of the beam director;
FIG. 5 is an end elevational view of the beam director;
FIG. 6 is a fragmentary perspective view of a large sample cell, shown in place;
FIG. 7 is an end view of a small sample cell shown in place;
FIG. 8 is an isometric schematic view of a "lens-equivalent" of the optical system of the spectrophotometer employed in explaining its operation;
FIG. 9 is a schematic view of a part of the optical system employed in explaining how diverging rays passing through a sample cell are focused on a photo-sensitive surface;
FIG. 10 is a graph employed in explaining the operation of the invention;
FIG. 11 is a diagram employed in explaining the characteristics of a toric mirror; and
FIG. 12 is a large perspective view of the sample region diagrammatically showing the radiation passing through the region.

Referring to the drawing and more particularly to FIG. 1, there is illustrated a spectrophotometer embodying the present invention and comprising a monochromator 10 of the Littrow type for transmitting radiation of selected wavelength from a source unit 15 including an incandescent lamp 12 through an exit slit $S_0$ along an optical axis X—X into a testing unit 30.

In the monochromator here illustrated, a beam of light is projected from a source 12 through an entrance slit 14 onto a curved first mirror 16 and from thence to a prism 17 and then by a return path to the same first mirror 16 and from there to a second mirror 18 through a slit 19 to a third mirror 20 and then to a curved fourth mirror 22 to a second prism 24 and from there by a return path to the fourth mirror 22 from where it is transmitted along the optical axis X—X to an exit slit $S_0$. In a typical case the mirrors 16 and 22 of the monochromator are spherical and anastigmatic, while the mirrors 18 and 20 are flat.

With this arrangement monochromatic radiation of a selected wavelength is projected outwardly through the exit slit $S_0$ as determined by setting the prisms 17 and 24 at a suitable angle relative to the beams which are refracted and reflected by them. In practice, the prisms are arranged to be rotated about parallel vertical axes that are normal to the horizontal plane in which the beam is transmitted from the entrance slit 14 to the exit slit $S_0$, and the two prisms are rotated in synchronism by well-known conventional means constituting a wavelength control unit W, which causes the spectrum to be swept horizontally past the exit slit $S_0$. In the particular arrangement described herein, the exit slit $S_0$ is in the form of an elongated vertical narrow slit. In practice, the width of the slits 14 and $S_0$ may be adjusted simultaneously by means of a slit-width control mechanism SW, by moving the jaws that define the slits by equal distances in opposite directions from the vertical axis of the slit.

Also, in the particular system described herein, it is assumed that the aperture stop is defined by, or at least mounted upon, the face of the second prism 24. Normally, a corresponding aperture stop is present at the first prism 17. In the following description, however, the aperture stop referred to is the effective aperture stop defined by the virtual image of the second prism 24 that is formed by the mirror 22. For convenience, in analysis of the invention, it is assumed that this aperture stop is rectangular, especially since this is the most effective type of aperture stop to employ in this invention. The virtual image $A_0$ of this aperture stop is formed by the concave mirror 22 at a position that is to the left of the mirror 22 and is on the optic axis X—X.

The monochromator 10 is characterized by two Lagrange constants, a vertical Lagrange constant $L_v$, and a horizontal Lagrange constant $L_h$, which are expressed by the following equations:

$$L_v = \frac{A_{0v} S_{0v}}{d}$$

and $$L_h = \frac{A_{0h} S_{0h}}{d}$$

where $A_{0v}$ = height of aperture stop
$A_{0h}$ = width of aperture stop
$S_{0v}$ = height of exit slit
$S_{0h}$ = width of exit slit
$d$ = distance from virtual image of aperture stop to exit slit $S_0$.

In this invention the vertical Lagrange constant applies to the sample region. Hereinafter it will be assumed for convenience that the aperture stop is square, so that $$A_{0h} = A_{0v} = A_0$$

Since the mirror 22 is spherical and anastigmatic, both the horizontal and vertical images of the aperture stop lie at the same distance from the exit slit $S_0$. However, it will be understood that this limitation is not essential to the operation of this invention, and that if the mirror 22 is astigmatic, suitable modification may be made in the optical systems hereinafter described to obtain the advantages of the invention.

Monochromatic radiation that passes through the exit slit $S_0$ is transmitted by the astigmatic lens $L_0$ along the optic axis X—X to a beam director BD that alternately transmits the radiation through a large reference sample cell $C_R$ that contains air or some other transparent reference sample, and a large test sample cell $C_T$ that contains a sample of transparent material that is to be tested.

The beams of light that are transmitted through the two cells $C_R$ and $C_T$ are directed to the common photocell P, where they alternately excite the photosensitive element K thereof.

The output of the photocell is transmitted through an amplifier $a$ to a ratio measuring circuit $r$ which determines the ratio of the intensities of radiation that are transmitted through reference and test cells $C_R$ and $C_T$ located on reference and test paths $P_R$ and $P_T$, respectively, of the testing unit 30. The ratio of intensities represents the ratio of transmission coefficient of the samples in the respective cells. The output of the ratio measuring circuit is recorded as a spectrogram by means of an automatic recorder R that is driven by the wavelength control unit W, all as is described in more detail in said copending patent application Serial No. 411,794. The beam director BD not only serves to transmit the beam to the photocell P alternately along the two paths $P_R$ and $P_T$, but also operates as a timing control unit for operating the amplifier $a$ and the ratio measuring circuit $r$. The manner in which the amplifier $a$ and ratio measuring circuit $r$ are controlled by the beam director BD is also described in detail in said copending application Serial No. 411,794.

In the form shown in detail in FIGS. 2, 3 and 4, the beam director 50 comprises a chopper disk 52 and a chopper disk hub 54 that are mounted on the shaft 56 of a four-pole synchronous motor $m$. The axis of the shaft intersects the optic axis X—X and lies in a horizontal plane. The chopper disk is provided with two 90° or quadrant windows, namely, a reference sample window $W_1$ and a test sample window $W_2$ that are diametrically opposed. The chopper disk also includes a central circular window $W_3$. The chopper disk hub 54 is provided with a 180° or semicircular window $W_4$.

A semi-circular mirror $M_{1T}$ extends outwardly from the hub in a plane perpendicular to the shaft of the motor $m$. This mirror is located directly behind the test sample window $W_2$ but at a smaller radius. The chopper disk 52 is mounted within a housing 55 defined by vertical walls 55a and 55b. These walls are provided with windows which define a first, or vertical, mask VM. A second, or horizontal, mask HM is mounted between the chopper disk and the plane of the rotating mirror $M_{1T}$. A first light trap formed by the front housing wall 55a and another wall 56a, prevents any light reflected by the quadrant sectors 53 from entering the sample regions in which the cells $C_R$ and $C_T$ are located. A second light trap formed by the rear housing wall 55b and another wall 56b prevents any light reflected forwardly by the second horizontal mask from entering the sample regions.

The sample cells $C_R$ and $C_T$, which are of the large type, are of tubular configuration and formed with flat transparent faces at opposite ends thereof. These sample cells define the sample region which, according to the present invention, satisfies Lagrange's equation at its ends in a vertical plane. Small sample cells may be mounted at the center of the sample region with the longitudinal axes of these cells vertical. Suitable means, such as those shown in FIGS. 6 and 7, are employed to mount either large or small cells at predetermined positions in the sample regions.

As the motor $m$ rotates, the beam is alternately intercepted by the opaque 90° or quadrant sectors 53 that separate the windows $W_1$ and $W_2$, and light is periodically transmitted through the reference window $W_1$ and the test window $W_2$. When radiation is being transmitted through the reference window $W_1$, it passes beyond the edge of the hub 54 and strikes a stationary mirror $M_{1R}$ which reflects the monochromatic beam of radiation toward a toric mirror $M_{2R}$, which reflects the beam along the reference path $P_R$ through the reference cell $C_R$ to a toric mirror $M_{3R}$, which in turn reflects the beam to a toric mirror $M_{4R}$ and from there to the photocathode K. But when radiation is being transmitted through the test sample window $W_2$, it strikes the rotating mirror $M_{1T}$, and is reflected along a path that extends through the semi-circular window $W_4$, then through the central circular window $W_3$ to a toric mirror $M_{2T}$, and then along a path through the sample cell $C_T$ to a toric mirror $M_{3T}$, and from there to a toric mirror $M_{4T}$, and from there to the photocathode K. As explained more fully hereinbelow, the toric mirrors $M_{2R}$ and $M_{2T}$ are astigmatic, while the toric mirrors $M_{3R}$, $M_{3T}$, $M_{4R}$ and $M_{4T}$ are anastigmatic.

In order that the optical properties of the paths along which radiation is transmitted through the reference cell $C_R$ and the test cell $C_T$ shall be substantially identical, the corresponding toric mirrors $M_{2R}$ and $M_{2T}$ and the corresponding toric mirrors $M_{3R}$ and $M_{3T}$ and the corresponding toric mirrors $M_{4R}$ and $M_{4T}$ have the same focal properties. Furthermore, the lengths of the optical paths from the exit slit $S_0$ to the photocathode K through the respective cells $C_R$ and $C_T$ are made identical in order to accomplish this result. The axis of symmetry Y—Y of the optical system that includes the toric mirrors $M_{2R}$ and $M_{2T}$, $M_{3R}$, $M_{3T}$, $M_{4R}$ and $M_{4T}$, and the photocathode K is displaced somewhat from, but is parallel to, the optic axis X—X, along which radiation enters the testing unit 30 from the monochromator.

From the foregoing description of the beam director BD, it will be noted that in each cycle of operation, or each revolution, of the motor, a pulse of light $L_R$ is transmitted through the reference cell $C_R$ to the photocell P, and that another pulse of light $L_T$ is transmitted through the test cell $C_T$ to the photocell P, thereby forming two alternating series of separate light pulses that are separated by dark intervals. The light pulses excite the photocell, thereby providing signals which may be employed to measure the ratio of the transmission coefficients of the samples contained in the respective cells $C_R$ and $C_T$, as explained in said copending application Serial No. 411,794.

The manner in which the beam director and the optical system between the exit slit $S_0$ and the photocathode K cooperate to manitain high efficiency and uniform sensitivity under various conditions and otherwise accomplish the objects of the invention can best be appreciated by considering a specific embodiment of the invention, such as that which is described in detail below.

In order to facilitate an understanding of the invention, a "lens-equivalent" thereof is illustrated in FIG. 8. This lens-equivalent functions in a similar manner to that which employs toric mirrors as illustrated in FIGS. 1 and 2, except that the optic axis of the lens system is a straight line from the exit slit $S_0$ to the photocathode K. However, if lenses were employed instead of mirrors, they would not be so satisfactory since they would be subject to chromatic aberration or else would require the use of expensive achromatic lenses. Furthermore, the toric mirror system of FIGS. 1 and 2 has the advantage over the lens system of FIG. 8 in that light can be transmitted along two different paths from the exit slit to the photocathode K when a toric mirror system is employed, whereas this is impossible with a lens system in which a rectilinear optic axis is employed.

In FIG. 8 the scale in directions normal to the optic axis has been exaggerated compared with that along the optic axis X—X.

In this specific embodiment of the invention, the aperture stop $A_0$ formed by the prism 24 is square. The image of the aperture stop is located 160 cm. from the exit slit $S_0$ on the same side thereof as the mirror 22. The exit slit $S_0$ itself is assumed, by way of example in this specific embodiment of the invention, to have a height $S_{0v}$ equal to 2.0 cm. and a horizontal width $S_h$ equal to 0.15 cm.

With this invention, a change in the width of the exit slit $S_0$ alters the intensity of the beam transmitted into the testing unit 30 without however substantially altering the width of the image formed on the photocathode. For this reason, the width of the exit slit $S_0$ may be modified without substantially altering the sensitivity of the system because of any variations in the sensitivity of the photocathode from one area thereof to another.

In order to facilitate an understanding of the following description the following definitions have been adopted. A vertical image is one in which rays diverging from each point of an object converge upon a corresponding horizontal line in the image. In such a case, rays from any point on the object to any point in the image may be traced in a vertical plane parallel with the optic axis. Expressed differently, the deviations of rays causing vertical focusing may be traced by the projection of the rays upon such a vertical plane. Likewise a horizontal image is one in which rays diverging from each point of the object converge upon a corresponding vertical line in the image. In the latter case, rays from any point in the object to any point in the image may be traced in a horizontal plane parallel to the optic axis. Expressed differently, the deviations of rays causing horizontal focusing may be traced by the projection of the rays upon such a horizontal plane. In both cases the description of the image is derived from the orientation of the plane in which components of rays travelling from one point to another diverge from or converge at the projection of the point on the plane in question. For simplicity in representing the vertical and horizontal images in the drawings, a vertical image of an object such as an aperture is represented in the drawings by a vertical line on the optic axis, and a horizontal image of such an object is represented in the drawings by a horizontal line on the optic axis. In this specification, a vertical focal length or power is one which refers to the forming of vertical images and determines the divergence and convergence of rays in a vertical plane. Likewise a horizontal focal length or power is one which refers to the forming of horizontal images and determines the divergence and convergence of rays in a horizontal plane. A vertical power of a mirror is determined by a curved surface having a horizontal axis. Such a surface has a vertical radius of curvature, that is, a radius of curvature as measured in a vertical plane. A horizontal power is determined by a curved surface having a vertical axis. Such a surface has a horizontal radius of curvature, that is, a curvature as measured in a horizontal plane. In this specification, the term astigmatism is employed to indicate that the vertical focal length or power differs from the horizontal focal length or power of the optical element to which it refers. In this specification the term horizontal collimation refers to the locating of an object or image at the principal horizontal focus of a focusing device such as a lens or mirror or combination thereof, so that horizontal components of rays that diverge from any point of that object or image and emerge from the focusing device are parallel. Likewise in this specification, the term vertical collimation refers to the locating of an object or image at the principal vertical focus of a focusing device so that vertical components of rays that diverge from any point of that object or image and emerge from the focusing device are parallel. For brevity in this specification, a particular region is said to be collimated with respect to an image or an aperture, source or other object if rays of light emerging from any point of that image or object are rendered parallel in that region. In this connection, if the components of the rays in a particular plane are parallel, the object is said to be collimated in that plane.

An astigmatic lens $L_0$ located adjacent to the exit slit $S_0$ forms a vertical image $A_{1v}$ of the aperture stop at a position adjacent the plane of the chopper disk. The height of this image is very small compared with the height of the aperture stop and is small compared with the arcuate width of the shutter windows $W_1$ and $W_2$ at the point where the windows intercept the beam at the optic axis X—X.

No horizontal image of the aperture stop is formed at this point. However, the beam has a substantial horizontal width at this point. The vertical mask VM is located in a plane that is transverse to the optic axis and that lies adjacent the vertical image $A_{1v}$. The aperture in the vertical mask VM has a height that is slightly greater than that of the vertical image $A_{1v}$. The width of this aperture is slightly greater than the width of the beam at this position. The aperture in the vertical mask HM is just sufficient to permit the beam to pass through it. The vertical mask VM trims the top and bottom edges of the beam as well as the sides.

Inasmuch as the height of the vertical image $A_{1v}$ formed by the lens $L_0$ is small compared to the width of that portion of the windows $W_1$ and $W_2$ through which the beam passes, when the beam is chopped by the beam chopper 52, the intensity of radiation that is transmitted to the photocell P is of trapezoidal configuration rising rapidly to a peak value where it remains for a substantial period and then falling rapidly to a zero value as indicated in FIG. 10.

The astigmatic lens $L_0$ forms a horizontal image of the aperture stop at the position of the horizontal mask HM. The horizontal mask prevents diffracted rays lying outside the main or geometrical image from being transmitted to the photocell. For this reason, any error that might arise because of irregular or uncertain reflection of the diffracted rays from various parts of the apparatus is avoided. When a flicker-beam method is employed, the use of a single mask in the beam before it is divided by the beam director BD insures identical trimming of the two branches of the beam. It is to be noted that any diffracted rays reflected by the vertical mask VM are trapped.

It is to be noted that the plane of rotation of the mirror $M_{1T}$ is adjacent the horizontal mask HM, so that an image of the aperture stop is formed at the plane of the rotating mirror. For this reason, if the mirror wobbles in its rotation because of inaccuracy of its orientation relative to the axis of rotation of the motor $m$, the rays reflected therefrom appear to come from a common source at that point. As will be seen later, the effects of such wobble are overcome by employing an optical system in which the chopping position and the photocathode are arranged at conjugate foci so far as horizontal imaging is concerned. In this way horizontal displacement of the image focused on the photocathode that would result from wobble is minimized. To make this possible, a horizontal image of the aperture stop is formed at the mirror position. Another advantage of forming a horizontal image of the aperture stop at the mirror position is that the width of the beam is rendered a minimum at that position.

Radiation passing through the vertical and horizontal masks VM and HM is transmitted along the reference path $P_R$ or along the test path $P_T$, in accordance with whether the radiation is passed through the reference window $W_1$ or the test window $W_2$. When the radiation is transmitted through the reference window $W_1$, it strikes the plane mirror $M_{1R}$, as described hereinbefore, being reflected to the toric mirror $M_{2R}$, but when radiation is transmitted through the test window $W_2$, it is reflected by the rotating mirror $M_{1T}$ to the toric mirror $M_{2T}$. The two plane mirrors $M_{1R}$ and $M_{1T}$ have substantially equal reflection coefficients, and the same spectral characteristics, preferably being front surface mirrors composed of some suitable material such as aluminum.

The two astigmatic toric mirrors $M_{2R}$ and $M_{2T}$ have the same optical characteristics as viewed from the cells $C_R$ and $C_T$, or, expressed in other ways, so far as the effects that they have on the beams reflected by them is concerned. Both mirrors $M_{2R}$ and $M_{2T}$ are represented in FIG. 8 by the same equivalent lens $M_2$.

The lens $M_2$ and the two mirrors $M_{2T}$ and $M_{2R}$ have the same focusing properties when applied to the particular light beams that impinge upon them. However, in order to make the lengths of the two optical paths the same, the geometrical properties of the two mirrors $M_{2T}$ and $M_{2R}$ are different, as explained more fully hereinafter.

In accordance with this invention, each of the astigmatic toric mirrors $M_{2R}$ and $M_{2T}$, or the astigmatic lens $M_2$, forms a vertical image of the exit slits $S_0$ at one end of each of the sample cells $C_R$ and $C_T$ and a vertical image of the aperture stop at the other end of each of the cells $C_R$ and $C_T$. In the specific embodiment of the invention described herein the vertical image $S_{2v}$ of the exit slits $S_0$ is formed at the front end of each of the cells $C_R$ and $C_T$ and the vertical image $A_{2v}$ of the aperture stop is formed at the rear end of each of the cells $C_R$ and $C_T$. In the particular system described herein in order to make it possible to utilize cells of minimum circular cross-section, these two images are not only focused at the ends of the cells, but the system is so designed that the images have the same height. Each of the toric mirrors $M_{2R}$ and $M_{2T}$, or the equivalent lens $M_2$, forms the horizontal image $S_{2h}$ of the exit slit $S_0$ at the center of the cells $C_R$ and $C_T$ midway between the ends thereof. It is to be noted that the width of the horizontal image $S_{2h}$ of the exit slit $S_0$ formed in the cells is about the same as the width of the exit slit $S_0$ itself.

It will be noted by reference to FIG. 12 that the radiation passing through the sample regions is in the form of a pair of opposed truncated pyramids of rectangular cross-section that are joined at their apices. Though the cross-sectional area of the beam is higher at all points than it is wide, nevertheless, this arrangement is very satisfactory to employ in practice, since large sample cells are of circular configuration and may be placed in the beams in any orientation. They are also satisfactory in practice because small sample cells indicated in FIG. 12 by the letter $C_S$ may be located in the central portion of the beams where they are of minimum cross-sectional area. The width of a small sample cell must be greater than the width of the horizontal image of the exit slits. For this reason the width of the exit slit itself must be restricted in accordance with the width of the small cell. However, the width of the beams at the ends of the large cell are very small compared to their heights, so that there is little restriction on the width of the exit slit that may be employed with such large cells.

The horizontal image $A_{1h}$ of the aperture stop is located at the focal point of each of the mirrors $M_{2R}$ and $M_{2T}$ or of the lens $M_2$, being horizontally collimated with respect thereto, so that the horizontal image of the aperture stop that is formed by these elements is located at infinity. In practice, of course, it is only necessary for this image to be located a very long distance from the remaining parts of the optical system.

It is to be noted that the vertical and horizontal powers of the two toric mirrors $M_{3R}$ and $M_{3T}$ are equal even though the radii of curvature of the mirrors in the vertical and horizontal planes are unequal. The inequality of radii of curvature to produce equal powers in the two planes is required because of the fact that the radiation being focused by the mirrors is incident on them at an acute angle of 45°. In a similar way, the toric mirrors $M_{4R}$ and $M_{4T}$ have equal horizontal and vertical focal lengths but unequal radii of curvature in the vertical and horizontal planes. However the equivalent lens $M_3$ is spherical and anastigmatic.

Each pair of these elements, namely the mirrors $M_{3R}$—$M_{4R}$ and the mirrors $M_{3T}$—$M_{4T}$ and $M_3$—$M_4$ form an optical system of the same focal length. The photocathode K is located at the principal focal plane of the optical systems formed by those pairs. The power of each of the mirrors and its equivalent lens that is closer to the photocathode K is greater than the power of the corresponding element farther from the photocathode. The first of each pair of these elements reduces the size of the beams at the second of each pair. For this reason, the latter elements may be made small and therefore placed close together to focus their respective horizontal images over the same area of the photocathode. Complete overlap or identity of such images is assured when employing an end face photocell such as one of Type 5819 or Type 6199. A vertical image $S_{3v}$ of the exit slit is formed between the elements $M_3$ and $M_4$. A horizontal image $S_{3h}$ of the exit slit is also formed between the elements $M_3$ and $M_4$. A horizontal image of the aperture slit $A_{3h}$ is also formed between the elements $M_3$ and $M_4$. A vertical image $A_{4v}$ of the aperture stop is formed between the element $M_4$ and the photocathode K, while a vertical image $S_{4v}$ of the exit slit $S_0$ is formed behind the cathode K. A horizontal image $A_{4h}$ of the aperture stop is formed at the photocathode.

With this invention a change of refractive index of a sample in a sample cell does not alter the size of the beam formed at the photocathode K nor the distribution of energy at the photocathode. The reason for this is that even though a change in sample may result in displacement of rays passing therethrough, the direction of travel of such rays remains unaffected; consequently, each displaced ray is focused at the same point of the photocathode as the corresponding undisplaced ray, since these two rays are parallel and the photocathode is at the focus of the optical device comprising the pairs $M_{3R}$—$M_{4R}$, $M_{3T}$—$M_{4T}$, and $M_3$—$M_4$. This fact may be understood by reference to FIG. 9 where both an undisplaced ray is shown as a dashed line and a displaced ray is shown as a solid line traced from the entrance of a cell to the photocathode K. In this arrangement the optical system between the sample cell and the photocell has been represented by a single lens merely for simplicity, even though the optical system may comprise two mirrors or two lenses as illustrated hereinbefore.

It is thus apparent from FIG. 9 that each bundle of parallel rays of light that enters one of the samples along any path whatsoever emerges therefrom as a displaced but undeviated bundle of rays of light. This condition is maintained irrespective of the index of refraction of the sample so long as the faces at the opposite ends of the sample cells are parallel and even though those faces are not perpendicular to the optical axes $P_R$ and $P_T$ along which the beams pass.

Table I.—Powers

| Optical element | Position | $G_v$ | $G_h$ |
|---|---|---|---|
| $L_0$ | 0.50 | 0.1754 | 0.1190 |
| $M_2$ | 18.79 | 0.1177 | 0.1013 |
| $M_3$ | 47.74 | 0.244 | 0.244 |
| $M_4$ | 56.44 | 0.618 | 0.618 |

Table II.—Image and beam sizes

| Image | Position | Dimensions | |
|---|---|---|---|
| | | Vertical | Horizontal |
| $A_0$ | −160 | 10 | 10 |
| $S_0$ | 0 | 2.0 | 0.30 |
| $A_{1v}$ | 5.96 | 0.726 | (0.690) |
| $A_{1h}$ | 9.37 | (1.016) | 0.884 |
| $S_{2v}$ | 33.99 | 1.58 | (0.90) |
| $S_{2b}$ | 38.99 | (1.58) | 0.316 |
| $A_{2v}$ | 43.99 | 1.58 | (0.90) |
| $A_{2h}$ | ∞ | ∞ | ∞ |
| $A_{3h}$ | 51.84 | | 0.48 |
| $S_{3v}$ | 53.58 | 0.68 | (0.38) |
| $S_{3b}$ | 55.44 | | 0.280 |
| $A_{4v}$ | 58.13 | 0.66 | |
| $A_{4h}$ | 58.94 | | 0.266 |
| $S_{4v}$ | 60.18 | 0.88 | |

The positions and powers of the various lenses and mirrors in a specific embodiment of the invention are summarized in Table I, and the positions and dimensions of the various masks, slits, and images thereof and the dimensions of the beams at various positions in this embodiment are tabulated in Table II. In these tables the powers $G_v$ and $G_h$ are given in reciprocal centimeters, while the remaining dimensions are given in centimeters. The positions of the various elements are measured from the exit slit $S_0$ along the axis of the beam, the positions being indicated as positive on the down-beam side and negative on the up-beam side. In Table II the dimensions that are in parentheses refer to beam widths or heights while the other dimensions refer to image lengths. Thus, the vertical image $A_{1v}$ has a length of 0.726 cm. in a vertical plane, but the beam at that point has a width of 0.690 cm. The various angular directions of travel of the beams are indicated in FIG. 2.

In FIG. 11 a toric mirror M of the type that is employed in this spectrophotometer is illustrated. Such a toric mirror is in the form of a symmetrical equatorial segment of a tore, that is, a surface that is formed by rotating a circle or other conic section about a fixed axis in the plane of the conic section. In this particular embodiment of the invention the toric surfaces may be considered as generated from circles. Such a toric surface is characterized by two radii of curvature, one in a plane that includes the axis of rotation and the other in a plane normal thereto. Two types of such toric surfaces exist, depending upon whether the axis of rotation is at the origin of the longer of the two radii of curvature. If the axis of rotation lies outside the generating circle the figure generated is in the form of a doughnut. In all the toric surfaces described herein, the surface possesses a large radius $R_h$ lying in a horizontal plane and extending to the outer edge of the tore, and a small radius $R_v$ that is the radius of the generating circle. The radii $R_h$ and $R_v$ represent respectively the horizontal and vertical radii of curvature of the toric mirror M. It can be shown that the vertical and horizontal powers of a toric mirror which reflects light at an angle of incidence and reflection $\theta$ between the central horizontal rays of the beams are given respectively by the following equations:

$$G_v = \frac{2 \cos \theta}{R_v}$$

$$G_h = \frac{2}{R_h \cos \theta}$$

In the particular device described herein the angle of incidence and reflection of rays that strike the mirror $M_{2R}$ is 32.1°, while the angles of incidence and reflection of rays striking the toric mirror $M_{2T}$ is 42.5°. The angles of incidence and reflection of the rays striking the mirrors $M_{3R}$ and $M_{3T}$ are 45°, and the angles of incidence and reflection of rays striking the mirrors $M_{4R}$ and $M_{4T}$ are 47.8°. In all cases the mirrors are of a sufficiently small size so that there is little difference in the angles of incidence and reflection of the various rays reflected from various parts thereof.

Table III.—Mirror characteristics

| Mirror | $\theta$, degrees | $R_v$ | $R_h$ | $G_v$ | $G_h$ |
|---|---|---|---|---|---|
| $M_{2R}$ | 36.4 | 12.5 | 26.8 | 0.1177 | 0.1013 |
| $M_{2T}$ | 42.5 | 13.7 | 24.5 | 0.1177 | 0.1013 |
| $M_{3R}$ | 45 | 5.82 | 11.8 | 0.244 | 0.244 |
| $M_{3T}$ | 45 | 5.82 | 11.8 | 0.244 | 0.244 |
| $M_{4R}$ | 47.8 | 2.18 | 4.82 | 0.618 | 0.618 |
| $M_{4T}$ | 47.8 | 2.18 | 4.82 | 0.618 | 0.618 |

In Table III above there is a summary of the radii of the toric mirrors employed. The radii of curvature given in this table are expressed in cm.

The specific set of dimensions given above and shown in FIG. 2 is merely one of an infinite number that may be employed in accomplishing the objects of this invention. It is therefore understood that other sets of dimensions and also many other different forms of the invention may be employed without departing from its fundamental principles.

From the foregoing it is apparent that I have provided a spectrophotometer which has all the following characteristics:

(1) The distribution of energy on the photocathode is substantially constant, regardless of changes in the refractive index or the length of the optical path through the sample.

(2) The distribution of energy on the photocathode is substantially constant, regardless of changes in the width of the exit slit.

(3) The distribution of energy on the photocathode is substantially independent of wobble of the mirror employed in deflecting the beam down one of the paths of a flicker-beam system.

(4) The distribution of energy at the photocathode is substantially independent of wavelength.

(5) The distribution of energy at the photocathode is approximately the same for both paths of a flicker-beam system.

(6) The two paths of the flicker-beam system have substantially the same optical properties.

(7) The two paths of the flicker-beam system are parallel.

(8) The beams formed in the sample region permit the use of both long and short cells without affecting relative distribution of radiation on the photocathode.

(9) The size of the beam is greatly reduced between the exit slit and the photocathode.

(10) The effects of light diffracted horizontally by the exit slit of the monochromator are eliminated by masking.

(11) Light pulses of trapezoidal shape are formed.

All of the foregoing results have been obtained simultaneously with the present optical system by virtue of the fact that astimgatic elements have been employed between the exit slit of the monochromator and the sample regions and also by virtue of the fact that rays leaving the sample regions in parallel directions are focused upon the photocathode, even though the radiation emerging from the sample region diverges from images formed therein.

In this specification and in the claims the terms vertical and horizontal are not to be interpreted herein in their strict mathematical sense, it only being necessary to consider the relationship of images at various points in terms of the orientation of a vertical elongated slit. Thus, for example, the whole instrument might be mounted on an inclined plane instead of on a flat table. Furthermore, it is possible that a vertical slit could form images that are not vertical. This could occur, for example, if the axis of the motor were to be inclined to the plane that is normal to the exit slit. Accordingly, it is to be understood that when reference is made herein to a vertical image, we mean one which is an image of a particular line which in normal use is vertical, even though neither the line nor the image is in fact vertical and even though the image and the line are not parallel.

While the invention has been described only with reference to a specific embodiment thereof, it will be understood that it may be embodied in many other forms. For example, while the invention has been described with reference to the use of only certain photocells which are effective only over limited ranges of wavelength, by employing other photocells, the spectrophotometer may be utilized in other wavelength ranges. It will therefore be apparent to those skilled in the art that many changes and modifications may be made in the form, material, and relative arrangement of the parts without departing from the invention, as defined by the scope of the appended claims.

I claim:

1. In a spectrophotometer of the flicker-beam type:

a monochromator for projecting a beam of light along an optic axis, said monochromator including a source of radiation, a vertical exit slit, and means located between said source and said exit slit for defining an aperture stop;

means for directing said beam in two different directions;

means defining a pair of sample regions;

astigmatic focusing means including a pair of toric mirrors for reflecting light that has travelled in said two directions along two separate paths extending through the respective sample regions, each of the focusing means having equal horizontal focal lengths and equal vertical focal lengths, the horizontal focal length of each, however, being different from its vertical focal length, each of said focusing means focusing a vertical image of said exit slit at one end of the corresponding sample region and focusing a vertical image of said aperture stop at the other end of said corresponding sample region and focusing a horizontal image of said slit between the ends of said sample region, the distances travelled by light rays from said exit slit to the respective toric mirrors being equal, a pair of anastigmatic systems for reflecting light emerging from the respective sample regions onto the same focal positions.

said anastigmatic systems having equal focal lengths, the optical systems that project radiation from the exit slit and along the separate paths forming a pair of substantially coincident horizontal images of said aperture stop at said focal position.

2. In a spectrophotometer:

a monochromator for projecting a beam of light along an optic axis, said monochromator including a source of radiation, a vertical exit slit, and means located between said source and said exit slit for defining an aperture stop;

means including a movable mirror for periodically interrupting the beam projected along said axis at a chopping position to alternately direct said beam in two different directions;

means for defining a pair of sample regions;

astigmatic focusing means including a pair of toric mirrors for reflecting light that has travelled in said two directions along two separate paths extending through the respective sample regions, each of the focusing means having equal horizontal focal lengths and equal vertical focal lengths, the horizontal focal length of each, however, being different from its vertical focal length, each of said focusing means focusing a vertical image of said exit slit at one end of the corresponding sample region and focusing a vertical image of said aperture stop at the other end of said corresponding sample region and focusing a horizontal image of said slit between the ends of said sample region, the distances travelled by light rays from said exit slit to the respective toric mirrors being equal, a pair of anastigmatic systems for reflecting light emerging from the respective sample regions into the same focal position, said anastigmatic systems having equal focal lengths, the optical systems that project radiation from the exit slit and along the separate paths forming a pair of substantially coincident horizontal images of said aperture stop at said focal position.

3. In a spectrophotometer of the flicker-beam type:

a monochromator for projecting a beam of light along an optic axis, said monochromator including a source of radiation, a vertical exit slit, and means located between said source and said exit slit for defining an aperture stop;

a photocell including a photosensitive element;

means including a movable mirror for periodically interrupting the beam projected along said axis at a chopping position to alternately direct said beam in two different directions;

means defining a pair of sample regions;

astigmatic focusing means including a pair of toric mirrors for reflecting light that has travelled in said two directions along two separate paths extending through the respective sample regions, each of the focusing means having equal horizontal focal lengths and equal vertical focal lengths, the horizontal focal length of each, however, being different from its vertical focal length, each of said focusing means focusing a vertical image of said exit slit at one end of the corresponding sample region and focusing a vertical image of said aperture stop at the other end of said corresponding sample region and focusing a horizontal image of said slit between the ends of said sample region.

the distances travelled by light rays from said exit slit to the respective toric mirrors being equal, a second pair of anastigmatic focusing systems for reflecting light merging from the respective sample regions onto the same area of said photosensitive element, said anastigmatic focusing systems having equal focal lengths, said photosensitive element being mounted at the principal foci of said anastigmatic focusing systems, the optical system that projects radiation along each separate path forming a horizontal image of said aperture stop at the photosensitive element.

4. In a spectrophotometer of the flicker-beam type:

a monochromator for projecting a beam of light along an optic axis, said monochromator including a source of radiation, a vertical exit slit, and means located between said source and said exit slit for defining an aperture stop;

a photocell including a photosensitive element;

chopping means including a movable mirror for periodically interrupting the beam projected along said axis at a chopping position to alternately direct said beam in two different directions;

means for focusing a horizontal image of said aperture stop adjacent said chopping position;

means for forming a reduced vertical image of said aperture stop at a position adjacent said chopping position, said image being smaller than the area of the mirror on which it periodically falls;

a horizontal mask in front of said mirror for trimming diffracted rays from the vertical edges of said horizontal image;

means defining a pair of sample regions;

means including a pair of astigmatic toric mirrors for reflecting light that has travelled in said two directions along two separate paths extending through the respective sample regions;

said toric mirrors having equal horizontal focal lengths and equal vertical focal lengths, the horizontal focal length of each, however, being different from its vertical focal length, each of said toric mirrors focusing a vertical image of said exit slit at one end of the corresponding sample region and focusing a vertical image of said aperture stop at the other end of said corresponding sample region and focusing a horizontal image of said slit between the ends of said sample region;

the distances travelled by light rays from said chopping position to the respective toric mirrors being equal;

a pair of anastigmatic toric mirrors means for reflecting light emerging from the respective sample regions onto the same area of said photosensitive element;

said anastigmatic toric mirror means having equal focal lengths;

said photosensitive element being mounted at the principal foci of said anastigmatic toric mirrors means, the first astigmatic toric mirror and the anastigmatic toric mirror on each separate path forming a horizontal image of said aperture stop at the photosensitive element.

5. In a photometer:

means for projecting a beam of light along an optic axis, said means including a source of radiation, an exit pupil, and means located between said source and said exit pupil for defining an aperture stop, means for directing said beam in two different directions;

means defining a pair of sample regions;

astigmatic focusing means including a pair of toric mirrors for reflecting light that has travelled in said two directions along two separate paths extending through the respective sample regions;

each of said focusing means including said toric mirrors having equal horizontal focal lengths and equal vertical focal lengths, the horizontal focal length of each, however, being different from its vertical focal length, each of said focusing means focusing a vertical image of said exit pupil at one end of the corresponding sample region and focusing a vertical image of said aperture stop at the other end of said corresponding sample region, the distances travelled by light rays from said exit pupil to the respective toric mirrors being equal, a pair of anastigmatic systems for reflecting light emerging from the respective sample regions onto the same focal position, said anastigmatic systems having equal focal lengths, the optical systems that project radiation from the exit pupil along the separate paths forming a pair of substantially coincident images of said aperture stop at said focal position.

6. In a spectrophotometer:

a monochromator comprising a source of radiation, means defining a vertical exit slit, means for directing a beam of light from said source to said exit slit, said beam of light emerging from said exit slit along a predetermined optic axis, and means comprising an aperture stop between said source and said exit slit for defining the limits of said light beam;

means defining a sample region on said optic axis;

means for forming a vertical image if said aperture stop at one end of said sample region;

means for forming a vertical image of said exit slit at the other end of said sample region;

means for forming a horizontal image of said exit slit between the ends of said region;

means for collimating said aperture stop in a horizontal direction at said sample region;

a vertical photosensitive element mounted on said optic axis;

a focusing device between said sample region and said photosensitive element for focusing on said photosensitive element bundles of parallel rays emerging from said region.

7. In a spectrophotometer:

a monochromator comprising a source of radiation, means defining a vertically elongated exit slit, means for directing a beam of light from said source to said exit slit, said beam of light emerging from said exit slit along a predetermined optic axis, and means comprising an aperture stop between said source and said exit slit for defining the limits of said light beam;

means for mounting a sample chamber on said optic axis, said sample chamber being provided with an entrance window and an exit window disposed transversely to said optic axis;

means for focusing a vertical image of said aperture stop at one of said windows and a vertical image of said exit slit at the other of said windows;

means for focusing a horizontal image of said exit slit between said windows;

means for collimating said aperture stop in a horizontal plane at said sample chamber;

a vertically elongated photosensitive element mounted on said optic axis;

a focusing device between said sample chamber and said photosensitive element for focusing on said photosensitive element bundles of parallel rays emerging from said exit window.

8. In a photometer, means for projecting a beam of light from a source through an exit pupil and including means between said source and said exit pupil that defines and aperture stop at a position spaced from said exit pupil, means defining a sample region, means for focusing vertical images of said exit pupil and said aperture stop at opposite ends of said sample region, means for focusing a horizontal image of said exit pupil between the ends of said sample region, and means for measuring the intensity of radiation emerging from said sample region.

9. In a spectrophotometer, a monochromator in which monochromatic radiation is projected from a source through a vertical exit slit and including means between said source and said slit that defines an aperture stop at a position spaced from said exit slit, means defining a sample region, means for focusing vertical images of said slit and said aperture stop of equal vertical length at opposite ends of said sample region, means for focusing a horizontal image of said slit between the ends of said sample region, and means for measuring the intensity of radiation emerging from said sample region.

10. In a spectrophotometer, a monochromator in which monochromatic radiation is projected from a source through a vertical exit slit and including means between said source and said slit that defines an aperture stop at a position spaced from said exit slit, means defining a sample region, an astigmatic optical system for focusing vertical images of said slit and said aperture stop at opposite ends of said sample region and for focusing a horizontal image of said slit between the ends of said sample region, and means for measuring the intensity of radiation emerging from said sample region.

11. In a spectrophotometer, a monochromator in which monochromatic radiation is projected from a source through a vertical exit slit and including means between said source and said slit that defines an aperture stop at a position spaced from said exit slit, means defining a sample region, anastigmatic optical system for focusing vertical images of said slit and said aperture stop of equal vertical length at opposite ends of said sample region and for focusing a horizontal image of said slit between the ends of said sample region, and means for measuring the intensity of radiation emerging from said sample region.

12. In a spectrophotometer, a monochromator in which monochromatic radiation is projected from a source through a vertical exit slit and including means between said source and said slit that defines an aperture stop at a position spaced from said exit slit, means defining a sample region, a toric mirror for reflecting light emerging from said exit slit through said sample region, said toric mirror having unequal horizontal and vertical focal lengths, said toric mirror focusing vertical images of said slit and said aperture stop at opposite ends of said sample region and focusing a horizontal image of said slit between the ends of said sample region.

13. In a photometer, a vertical exit slit, a source of radiation and means between said source and said slit that defines an aperture stop, means defining a sample region, and an astigmatic focusing means between said exit slit and said sample region, said focusing means focusing a vertical image of said exit slit at one end of said sample region and a vertical image of said aperture stop at the other end of said sample region and horizontally collimating said aperture stop in said sample region.

14. In a photometer, an optical device having first and second vertical slits at first and second terminal positions respectively and means for transmitting radiation along a first path between said slits and also having means on said first path defining an aperture stop, means defining a sample region having an entrance window and an exit window and a sample center, an optical system for transmitting radiation into said entrance window to said sample center and out of said exit window along a test path between other first and second terminal positions and through said optical device along said first path, the first terminal positions of said two paths being at the same position, said optical system including astigmatic optical means having a horizontal focal length different from its vertical focal length, said astigmatic optical means being so arranged that said aperture stop and one of said windows are at conjugate positions in a vertical plane and that said first slit and the other of said windows are also at conjugate positions in a vertical plane and that said first slit and said sample center are at conjugate positions in a horizontal plane, a radiation source element and a radiation detector element, one of said elements being mounted at the second terminal position of said test path and the other element being operatively arranged adjacent the second terminal position of said first path, said radiation detector element being responsive to the intensity of radiation transmitted from said radiation source element along said paths.

15. In a photometer, an optical device having first and second vertical slits at first and second terminal positions respectively and means for transmitting radiation along a first path between said slits and also having means on said first path defining an aperture stop, means defining a sample region having an entrance window and an exit window, an optical system for transmitting radiation into said entrance window to said sample center and out of said exit window along a test path between other first and second terminal positions and through said optical device along said first path, the first terminal positions of said two paths being at the same position, said optical system including astigmatic optical means having a horizontal focal length different from its vertical focal length, said astigmatic optical means being so arranged that said aperture stop and one of said windows are at conjugate positions in a vertical plane and that said first slit and the other of said windows are also at conjugate positions in a vertical plane, and that said aperture stop is collimated in a horizontal plane in said sample region, focusing means between said sample region and the second position of said test path, said last mentioned second position being at the principal focus of said focusing means, a radiation source element and a radiation detector element, one of said elements being mounted at the second terminal position of said test path and the other element being operatively arranged adjacent the second terminal position of said first path, said radiation detector element being responsive to the intensity of radiation transmitted from said radiation source element along said paths.

16. A photometer as defined in claim 15 comprising means for altering the width of said first vertical slit without altering the width of said aperture stop.

17. In a photometer, an optical device having first and second vertical slits at first and second terminal positions respectively and means for transmitting radiation along a first path between said slits and also having means on said first path defining an aperture stop, means defining a sample region having an entrance window and an exit window and a sample center, an optical system for transmitting radiation into said entrance window to said sample center and out of said exit window along a test path between other first and second terminal positions and through said optical device along said first path, the first terminal positions of said two paths being at the same position, said optical system including astigmatic optical means having a horizontal focal length different from its vertical focal length, said astigmatic optical means being so arranged that said aperture stop and one of said windows are at conjugate positions in a vertical plane and that said first slit and the other of said windows are also at conjugate positions in a vertical plane and that said first slit and said sample center are at conjugate positions in a horizontal plane and that said aperture stop is collimated in a horizontal plane in said sample region, focusing means between said sample region and the second position of said test path, said last mentioned second position being at the principal focus of said focusing means, a radiation source element and a radiation detector element, one of said radiation elements being mounted at the second terminal position of said test path and the other radiation element being operatively arranged adjacent the second terminal position of said first path, said radiation detector element being responsive to the intensity of radiation transmitted from said radiation source element along said paths.

18. a photometer as defined in claim 17 comprising means for altering the width of said first vertical slit without altering the width of said aperture stop.

19. In a photometer, an optical device having first and second terminal positions at ends of a first path and also having means on said first path for defining an aperture stop, means for supporting a fluid sample chamber having transparent parallel end walls, an optical system for transmitting radiation through said end walls along a test path between other first and second terminal positions and through said optical device along said first path, the first terminal positions of said two paths being at the same position, said optical system including means establishing a conjugate relationship between a point in said sample chamber and a point in said optical device in at least one plane and collimating said aperture stop horizontally in said sample chamber, focusing means between said sample chamber and the second position on said test path, said last mentioned second position being at the principal focus of said focusing means, a radiation source element and a radiation detector element, one of said elements being mounted at the second terminal position of said test path and the other element being operatively arranged adjacent the second terminal position of said first path, said radiation detector element being responsive to the intensity of radiation transmitted from said radiation source element along said paths.

20. A photometer as defined in claim 19, comprising means for adjusting the horizontal width of the beam transmitted along said paths past said same position without altering the horizontal width of the beam at said aperture stop.

21. In a photometer, an optical device having first and second terminal positions at ends of a first path and also having means on said first path for defining an aperture stop, means defining a sample region, an optical system for transmitting radiation through said sample region along a test path between other first and second terminal positions and through said optical device along said first path, the first terminal positions of said two paths being at the same position, said optical system including astigmatic optical means having a horizontal focal length different from its vertical focal length, said astigmatic optical means being so arranged that said aperture stop and one end of said sample region are at conjugate positions in a vertical plane and that said first terminal position and the other end of said sample region are also at conjugate positions in a vertical plane and that said first terminal position and a point within said sample region are at conjugate positions in a horizontal plane, a radiation detector element, and means including a radiation source element for transmitting a narrow vertical beam along said paths past said same position, one of said radiation elements being mounted at the second terminal position of said test path and the other radiation element being operatively arranged adjacent the second terminal position of said first path, said radiation detector element being responsive to the intensity of radiation transmitted from said radiation source element along said paths.

22. In a photometer, an optical device having first and second terminal positions at the ends of a first path and also having means on said first path for defining an aperture stop, means defining a sample region, an optical system for transmitting radiation through said sample region along a test path between other first and second terminal positions and through said optical device along said first path, the first terminal positions of said two paths being at the same position, said optical system including astigmatic optical means having a horizontal focal length different from its vertical focal length, said astigmatic optical means being so arranged that said aperture stop and one end of said sample region are at conjugate positions in a vertical plane and that said first terminal position and the other end of said sample region are also at conjugate positions in a vertical plane, and that said aperture stop is collimated in a horizontal plane in said sample region, focusing means between said sample region and the second position of said test path, said last mentioned second position being at the principal focus of said focusing means, a radiation source element and a radiation detector element, one of said elements being mounted at the second terminal position of said test path and the other element being operatively arranged adjacent the second terminal position of said first path, said radiation detector element being responsive to the intensity of radiation transmitted from said radiation source element along said paths.

23. A photometer as defined in claim 22 comprising, means for adjusting the horizontal width of a beam transmitted along said paths past said same position without altering the horizontal width of the beam at the aperture stop.

24. In a photometer,
an optical device having first and second terminal positions at ends of a first path and also having means on said first path for defining an aperture stop,
means defining a sample region,
an optical system for transmitting radiation through said sample region along a test path between other first and second terminal positions and through said optical device along said first path, the first terminal positions of said two paths being at the same position, said optical system including astigmatic optical means having a horizontal focal length different from its vertical focal length,
said astigmatic optical means being so arranged that said aperture stop and one end of said sample region are at conjugate positions in a vertical plane and that said first terminal position and the other end of said sample region are also at conjugate positions in a vertical plane and that said first terminal position and a point within said sample region are at conjugate positions in a horizontal plane,
focusing means between said sample region and the second position of said test path, said last mentioned second position being at the principal focus of said focusing means,
a radiation detector element,
and means including a radiation source element for transmitting a narrow vertical beam along said paths past said same position,
one of said radiation elements being mounted at the second terminal position of said test path and the other element being operatively arranged adjacent the second terminal position of said first path,
said radiation detector element being responsive to the intensity of radiation transmitted from said radiation source element along said paths.

25. In a photometer,
an optical device having first and second terminal positions at the ends of a first path and also having means on said first path for defining an aperture stop,
means defining a sample region,
an optical system for transmitting radiation through said sample region along a test path between other first and second terminal positions and through said optical device along said first path, the first terminal positions of said two paths being at the same position,
means for adjusting the horizontal width of a beam transmitted along said paths past said same position without altering the horizontal width of the beam at the aperture stop,
said optical system including astigmatic optical means having a horizontal focal length different from its vertical focal length, said astigmatic optical means being so arranged that said aperture stop and one end of said sample region are at conjugate positions in a vertical plane and that said first terminal position and the other end of said sample region are also at conjugate positions in a vertical plane and that said first terminal position and a point within said sample region are at conjugate positions in a horizontal plane, and that said aperture stop is collimated in a horizontal plane in said sample region,
focusing means between said sample region and the second position of said test path, said last mentioned second position being at the principal focus of said focusing means,
a radiation source element and a radiation detector element, one of said elements being mounted at the second terminal position of said test path and the other element being operatively arranged adjacent the second terminal position of said first path,
said radiation detector element being responsive to the intensity of radiation transmitted from said radiation source element along said paths.

26. In a photometer,
an optical device having first and second vertical slits at first and second terminal positions respectively and means for transmitting radiation along a first path between said slits and also having means on said first path defining an aperture stop,
means defining a sample region having an entrance window and an exit window,
an optical system for transmitting radiation into said entrance window to said sample region and out of said exit window along a test path between other first and second terminal positions and through said optical device along said first path, the first terminal positions of said two paths being at the same position,
said optical system including a pair of optical elements having at least one of which has a horizontal focal length different from its vertical focal length, said optical elements being so arranged between said same position and said sample region that said aperture stop and one of said windows are at conjugate positions in a vertical plane and that said first slit and the other of said windows are also at conjugate positions in a vertical plane and that said aperture stop is collimated in a horizontal plane in said sample region, the beam of radiation having equal vertical lengths at said windows,
focusing means between said sample region and the second position of said test path, said last mentioned second position being at the principal focus of said focusing means,
a radiation source element and a radiation detector element, one of said radiation elements being mounted at the second terminal position of said test path and the other radiation element being operatively arranged adjacent the second terminal position of said first path,
said radiation detector element being responsive to the intensity of radiation transmitted from said radiation source element along said paths, 27. In a photometer,
an optical device having first and second terminal positions at ends of a first path and also having means on said first path for defining an aperture stop,
means defining a sample region,
an optical system for transmitting radiation through said sample region along a test path between other first and second terminal positions and through said optical device along said first path, the first terminal positions of said two paths being at the same position,
said optical system including a pair of optical elements at least one of which has a horizontal focal length different from its vertical focal length, said optical elements being so arranged between said same position and said sample region that said aperture stop and one end of said sample region are at conjugate positions in a vertical plane and that said first terminal position and the other end of said sample region are also at conjugate positions in a vertical plane and that said first terminal position and a point within said sample region are at conjugate positions in a horizontal plane,
a radiation detector element,
and means including a radiation source element for transmitting a narrow vertical beam along said paths past said same position, one of said radiation elements being mounted at the second terminal position of said test path and the other radiation element being operatively arranged adjacent the second terminal position of said first path,
said radiation detector element being responsive to the intensity of radiation transmitted from said radiation source element along said paths.

28. In a photometer, an optical device having first and second terminal positions at the ends of a first path and also having means on said first path for defining an aperture stop, means defining a sample region, an optical system for transmitting radiation through said sample region along a test path between other first and second terminal positions and through said optical device along said first path, the first terminal positions of said paths being at the same position, said optical system including a pair of optical elements at least one of which has a horizontal focal length different from its vertical focal length, said optical elements being so arranged between said same position and said sample region that said aperture stop and one end of said sample region are at conjugate positions in a vertical plane and that said first terminal position and the other end of said sample region are also at conjugate positions in a vertical plane and that said aperture stop is collimated in a horizontal plane in said sample region, the beam of radiation having equal vertical lengths at the ends of said sample region, focusing means between said sample region and the second position of said test path, said last mentioned second position being at the principal focus of said focusing means, a radiation source element and a radiation detector element, one of said radiation elements being mounted at the second terminal position of said test path and the other radiation element being operatively arranged adjacent the second terminal position of said first path, said radiation detector element being responsive to the intensity of radiation transmitted from said radiation source element along said paths.

29. In a photometer, an optical device having first and second terminal positions at the ends of a first path and also having means on said first path for defining an aperture stop, means defining a sample region, an optical system for transmitting radiation through said sample region along a test path between other first and second terminal positions and through said optical device along said first path, the first terminal positions of said two paths being at the same position, said optical system including a pair of astigmatic optical elements each of which has a horizontal focal length different from its vertical focal length, said optical elements being so arranged between said same position and said sample region that said aperture stop and one end of said sample region are at conjugate positions in a vertical plane and that said first terminal position and the other end of said sample region are also at conjugate positions in a vertical plane, and that said first terminal position and a point within said sample region are at conjugate positions in a horizontal plane and that said aperture stop is collimated in a horizontal plane in said sample region, the beam of radiation having equal vertical lengths at the ends of said sample region, focusing means between said sample region and the second position of said test path, said last mentioned second position being at the principal focus of said focusing means, a radiation source element and a radiation detector element, one of said radiation elements being mounted at the second terminal position of said test path and the other radiation element being operatively arranged adjacent the second terminal position of said first path, said radiation detector element being responsive to the intensity of radiation transmitted from said radiation source element along said paths.

30. In a spectrophotometer, a monochromator having first and second vertical slits respectively and means for transmitting monochromatic radiation along a first path between said slits and also having means on said first path defining an aperture stop, said second slit being at a first terminal position, means defining a sample region having an entrance window and an exit window and sample center, an optical system for transmitting radiation into said entrance window to said sample center and out of said exit window along a test path between said first slit and a second terminal position and through said monochromator along said first path, said optical system including astigmatic means comprising a toric mirror for establishing conjugate focal relationships in a vertical plane between the respective windows and said aperture stop and said first slit and for establishing a conjugate focal relationship in a horizontal plane between said sample center and said first slit, an optical element between said sample region and said second terminal position of said optical system, the principal focus of said optical element being located at said second terminal position, a radiation source element and a radiation detector element, one of said radiation elements being mounted at said second terminal position and the other radiation element being operatively arranged adjacent said first terminal position, said radiation detector element being responsive to the intensity of radiation transmitted from said radiation source element along said paths.

31. In a spectrophotometer, a monochromator having first and second vertical slits respectively and means for transmitting monochromatic radiation along a first path between said slits and also having means on said first path for defining an aperture stop, said second slit being at a first terminal position, means defining a sample region having an entrance window and an exit window and sample center, an optical system for transmitting radiation into said entrance window to said sample center and out of said exit window along a test path between said first slit and a second terminal position and through said monochromator along said first path, said optical system including astigmatic means comprising a toric mirror for establishing conjugate focal relationships in a vertical plane between the respective windows and said aperture stop and said first slit and for collimating said sample region in a horizontal plane with respect to said aperture stop, an optical element between said sample region and said second terminal position of said optical system, the principal focus of said optical element being located at said second terminal position, means for altering the width of said first vertical slit without altering the width of said aperture stop, a radiation source element and a radiation detector element, one of said radiation elements being mounted at said second terminal position and the other radiation element being operatively arranged adjacent said first terminal position, said radiation detector element being responsive to the intensity of radiation transmitted from said radiation source element along said paths.

32. In a spectrophotometer, a monochromator having first and second vertical slits respectively and means for transmitting monochromatic radiation along a first path between said slits
and also having means on said first path defining an
aperature stop, said second slit being at a first terminal position,
means defining a sample region having an entrance
window and an exit window and sample center,
an optical system for transmitting radiation into said
entrance window to said sample center and out of
said exit window along a test path between said first
slit and a second terminal position and through said
monochromator along said first path,
said optical system including astigmatic means comprising an astimagtic lens and an astigmatic toric
mirror for establishing conjugate focal relationships
in a vertical plane between the respective windows
and said aperture stop and said first slit and for establishing a conjugate focal relationship in a horizontal plane between said sample center and said
first slit and for collimating said sample region in a
horizontal plane with respect to said aperture stop,
an optical element between said sample region and said
second terminal position, the principal focus of said
optical element being located at said second terminal
position,
means for altering the width of said first vertical slit
without altering the width of said aperture stop,
a radiation source element and a radiation detector element, one of said radiation elements being mounted
at said second terminal position and the other radiation element being operatively arranged adjacent said
first terminal position, said radiation detector element being responsive to the intensity of radiation
transmitted from said radiation source element along
said paths.

33. In a spectrophotometer, a monochromator having first and second vertical slits
at first and second terminal positions respectively
and means for transmitting monochromatic radiation
along a first path between said slits and also having
means on said first path defining an aperture stop,
means defining a sample region,
an optical system for transmitting radiation through
said sample region along a test path between other
first and second terminal positions thereon and
through said monochromator along said first path, the
first terminal positions of said two paths being at the
same position, said optical system including first and
second astigmatic elements arranged in the order
named between said first slip and said sample region,
each of said astigmatic elements having a horizontal
focal length different from its vertical focal length,
said first astigmatic element establishing a conjugate
relationship between said aperture stop and first and
second intermediate image positions in vertical and
horizontal planes respectively arranged in the order
named between said first and second astigmatic elements,
the principal horizontal focus of said second astigmatic
element being located at said second intermediate
image position,
said second astigmatic element establishing a conjugate
relationship in a vertical plane between said first
intermediate image position with respect to the end
of said sample region remote therefrom and establishing a conjugate relationship in a vertical plane
between said first slit and the other end of said
sample region and establishing a conjugate relationship in a horizontal plane between said first slit and
a point within said sample region and collimating said
sample region with respect to said aperture stop in
a horizontal plane,
focusing means between said sample region and said
second position of said test path, the principal horizontal focus of said focusing means being located at
said last mentioned second position,
a radiation source element and a radiation detector element, one of said radiation elements being mounted
at said second terminal position and the other radiation element being operatively arranged adjacent
said first terminal position, said radiation detector element
being responsive to the intensity of radiation transmitted from said radiation source element along said
paths.

34. In a spectrophotometer, a monochromator having first and second vertical slits
at first and second terminal positions respectively
and means for transmitting monochromatic radiation
along a first path between said slits and also having
means on said first path for defining an aperture stop,
means defining a pair of displaced sample regions,
an optical system including mirror means for transmitting radiation through said sample regions along
corresponding separate horizontal test paths and
through said monochromator along said first path,
said test paths being joined at other first and second
terminal positions, the first terminal position of said
monochromator being at the same position as the first
terminal position of said test paths, said optical system including a pair of toric mirrors disposed on each
each test path on opposite sides of the corresponding
sample region, the toric mirror on each path between
said sample region and said coinciding terminal positions being astigmatic and having a horizontal focal
length different from its vertical focal length,
said optical system including a toric lens adjacent said
first slit and having a horizontal focal length different
from its vertical focal length,
said lens and said astigmatic toric mirrors having such
focal properties that said aperture stop and one end
of each sample region are at conjugate positions in
a vertical plane and that said first slit and the other
end of each sample region are also at conjugate positions in a vertical plane and that said first slit and a
point within each sample region are at conjugate positions in a horizontal plane and that each of said
sample regions is collimated with respect to said
aperture stop in a horizontal plane,
a radiation source element and a radiation detector element, one of said elements being mounted at said
second terimnal position and the other element being
operatively arranged adjacent said first terminal position, said radiation detector element being responsive
to the intensity of radiation transmitted from said
radiation source element along said paths,
and means for transmitting radiation alternately on said
said two test paths.

35. In a photometer, means defining a sample region,
means for causing radiation to emerge from said sample region as an uncollimated beam along diverging
paths,
a photosensitive element, and
an achromatic focusing means for directing radiation
that emerges from said sample region along different sets of parallel paths to common focal points,
said photosensitive element being fixedly mounted
at said focal points.

36. In a photometer, a sample chamber having a pair of optically parallel
transparent end walls,
means for directing radiation into said chamber
through one end wall and for causing radiation to
emerge from said sample chamber through the
other wall as an uncollimated beam along diverging
paths, a focusing mirror means for receiving said uncollimated beam, and
a photosensitive element fixedly mounted at the focal plane of said focusing mirror means, said focusing mirror means directing radiation that emerges from said sample region along various sets of parallel paths to corresponding common focal points in said plane.

37. In a photometer, means defining a pair of sample regions,
a source of radiation,
means for causing radiation to be transmitted from said source and along two different paths through the respective sample regions and for causing radiation to emerge from each said sample region as an uncollimated beam along diverging paths,
a photosensitive element, and
a pair of focusing means for directing radiation that emerges from each of the respective sample regions along a set of parallel paths to a single common focal point, said photosensitive element being mounted at said focal position.

38. In a photometer, a pair of sample chambers, each having a pair of optically parallel transparent end walls,
a monochromator having an exit slit and including means for changing the wavelength of radiation emerging from said exit slit,
means for causing radiation to be transmitted from said exit slit along two different paths that extend through the respective sample chambers and their end walls and for causing said radiation to emerge from each said sample chamber as an uncollimated beam along diverging paths,
a pair of focusing mirror means for receiving said uncollimated beams, said focusing mirror means having their focal planes at a common position whereby each set of parallel rays of each uncollimated beam is directed to a common point at said position, said rays being directed toward said position from the same side thereof, and
a photosensitive element mounted at said common position.

References Cited in the file of this patent

UNITED STATES PATENTS

| | | |
|---|---|---|
| 1,991,599 | Davis | Feb. 19, 1935 |
| 2,474,098 | Dimmick | June 21, 1949 |
| 2,604,810 | Backhouse | July 29, 1952 |
| 2,607,899 | Cary et al. | Aug. 19, 1952 |
| 2,750,834 | Golay | June 19, 1956 |

OTHER REFERENCES

Principles of Optics, first edition, published in 1932 by McGraw-Hill Book Co., New York, N.Y., pages 99–102 cited, Hardy and Perrin.